(12) United States Patent
Salter et al.

(10) Patent No.: US 10,576,825 B1
(45) Date of Patent: Mar. 3, 2020

(54) HEATED CHARGE PORT AND ASSOCIATED HEATING METHOD

(71) Applicant: Ford Global Technologies, LLC, Dearborn, MI (US)

(72) Inventors: Stuart C. Salter, White Lake, MI (US); David Brian Glickman, Southfield, MI (US); Zeljko Deljevic, Plymouth, MI (US); Phillip Marine, Royal Oak, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/287,217

(22) Filed: Feb. 27, 2019

(51) Int. Cl.
- *B60L 1/04* (2006.01)
- *H02M 3/156* (2006.01)
- *B60L 53/16* (2019.01)

(52) U.S. Cl.
CPC ............. *B60L 1/04* (2013.01); *B60L 53/16* (2019.02); *H02M 3/156* (2013.01)

(58) Field of Classification Search
CPC ............ B60L 1/04; B60L 53/16; H02M 3/156
See application file for complete search history.

(56) References Cited

U.S. PATENT DOCUMENTS

| | | | | |
|---|---|---|---|---|
| 7,960,857 B2* | 6/2011 | King | ................ | B60L 58/40 307/10.1 |
| 8,049,460 B2* | 11/2011 | Krauer | ................ | B60L 53/14 320/104 |
| 9,321,364 B1* | 4/2016 | Ashworth | ................ | B60L 5/02 |
| 2006/0250902 A1* | 11/2006 | Bender | ................ | B60L 58/20 369/1 |
| 2010/0280698 A1* | 11/2010 | Ichikawa | ................ | B60L 58/12 701/22 |
| 2013/0181679 A1* | 7/2013 | Naylor | ................ | H02J 7/34 320/134 |
| 2015/0115889 A1* | 4/2015 | Rill | ................ | B60L 1/02 320/109 |
| 2016/0221458 A1* | 8/2016 | Lopez | ................ | H05K 7/20927 |
| 2017/0334300 A1* | 11/2017 | Huang | ................ | H02J 7/0045 |
| 2019/0217713 A1* | 7/2019 | Salter | ................ | B60L 5/02 |

FOREIGN PATENT DOCUMENTS

| | | |
|---|---|---|
| DE | 102016122009 | 5/2018 |
| JP | 2012240478 | 12/2012 |
| JP | 2017212842 | 11/2017 |
| WO | 2018160571 | 9/2018 |

\* cited by examiner

*Primary Examiner* — Erez Gurari
(74) *Attorney, Agent, or Firm* — David Coppiellie; Carlson, Gaskey & Olds, P.C.

(57) ABSTRACT

A vehicle assembly includes, among other things, a power converter, a charge port assembly, and a thermal conduit that conveys thermal energy from the power converter to the charge port assembly. A charge port heating method includes, among other things, generating thermal energy with a power converter of a vehicle, and directing the thermal energy from the power converter to a charge port assembly using a thermal conduit.

19 Claims, 3 Drawing Sheets

HEATED CHARGE PORT AND ASSOCIATED HEATING METHOD

TECHNICAL FIELD

This disclosure relates generally to heating a charge port of an electrified vehicle. A power converter can generate thermal energy that is used for the heating.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles can charge the traction battery from an external power source, such as a grid source. A charger can electrically couple a charge port of the vehicle to the external power source.

SUMMARY

A vehicle assembly according to an exemplary aspect of the present disclosure includes, among other things, a power converter, a charge port assembly, and a thermal conduit that conveys thermal energy from the power converter to the charge port assembly.

In another non-limiting embodiment of the foregoing assembly, the charge port assembly includes a charge port housing. The charge port housing and the thermal conduit are formed together as a single monolithic structure.

Another embodiment of any of the foregoing assemblies includes a charge port door pivotably connected to the charge port housing.

Another embodiment of any of the foregoing assemblies includes an insulative layer covering at least a portion of a backside of the charge port door. The backside faces inwardly toward the charge port when the charge port door is in a closed position.

In another embodiment of any of the foregoing assemblies, the insulative layer is undersized relative to the backside such that a peripheral portion of the backside is left uncovered by the insulative layer.

In another embodiment of any of the foregoing assemblies, the thermal conduit includes an outer insulative layer and an inner thermally conductive layer.

In another embodiment of any of the foregoing assemblies, the outer insulative layer and the inner thermally conductive layer are both polymer-based.

In another embodiment of any of the foregoing assemblies, the inner thermally conductive layer comprises a thermally conductive ceramic.

In another embodiment of any of the foregoing assemblies, the outer insulative layer is overmolded about the inner conductive layer.

In another embodiment of any of the foregoing assemblies, the thermal conduit includes a plurality of fins. Each of the fins extends from the charge port housing to directly contact power converter.

In another embodiment of any of the foregoing assemblies, the power converter is a DC/DC step-down converter.

A charge port heating method according to another exemplary aspect of the present disclosure includes, among other things, generating thermal energy with a power converter of a vehicle, and directing the thermal energy from the power converter to a charge port assembly using a thermal conduit.

In another embodiment of the foregoing method, a first end portion of the thermal conduit interfaces directly with the power converter, and an opposite, second end portion of the thermal conduit extends directly from the charge port housing.

In another embodiment of any of the foregoing methods, the thermal conduit comprises a polymer-based material composition that includes an additive.

In another embodiment of any of the foregoing methods, the additive is graphite.

Another embodiment of any of the foregoing methods includes insulating the polymer-based material composition with an outer insulative layer.

Another embodiment of any of the foregoing methods includes, at the power converter, converting a supply of power from a first voltage to a different, second voltage.

Another embodiment of any of the foregoing methods includes providing the supply of power from a traction battery of an electrified vehicle.

Another embodiment of any of the foregoing methods includes directing the thermal energy toward an outer peripheral portion of a charge port door while insulating an inner peripheral portion of the charge port door from the thermal energy.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating a charge port area of an electrified vehicle. Heating the charge port area can, among other things, inhibit ice and snow from building up near the charge port. A power converter can generate thermal energy that is used for the heating.

Figure 1:
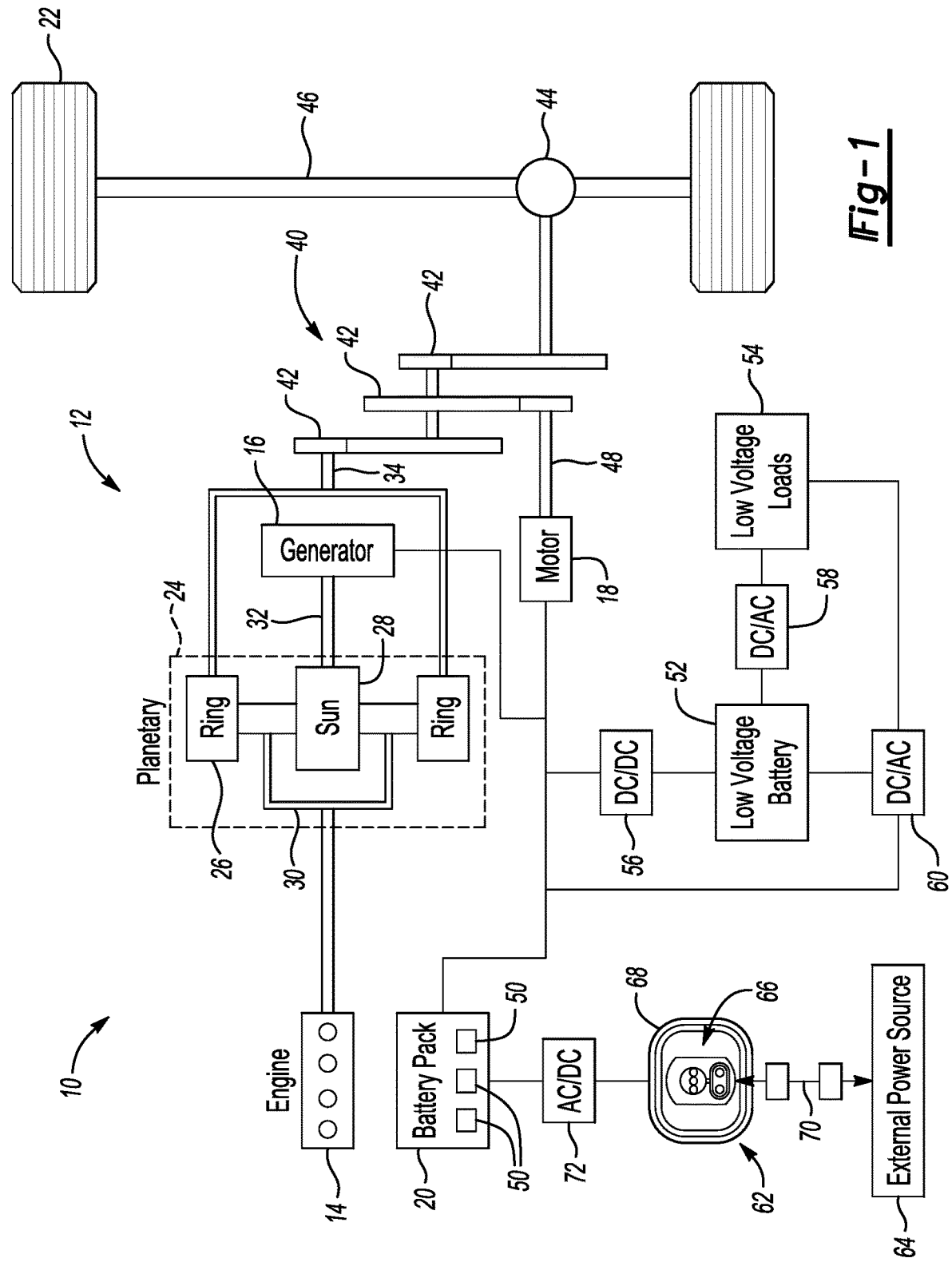
FIG. 1 illustrates a schematic view of a powertrain of an exemplary electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV). In other embodiments, the electrified vehicle is another type of electrified vehicle.

The exemplary powertrain 10 is a power-split powertrain system that employs a first drive system and a second drive system. The first drive system of the exemplary powertrain includes a combination of an engine 14 and a generator 16 (i.e., a first electric machine). The second drive system includes at least a motor 18 (i.e., a second electric machine), and a traction battery pack 20.

In the exemplary embodiment, the second drive system is considered an electric drive system of the powertrain 10. The first and second drive systems can generate torque to drive one or more sets of vehicle drive wheels 22 of the electrified vehicle 12. Although, a power-split configuration is depicted in FIG. 1, this disclosure extends to any hybrid or electric vehicle including full hybrids, parallel hybrids, series hybrids, mild hybrids, micro hybrids, all electric vehicles, etc.

The engine 14 is an internal combustion engine in the exemplary embodiment. The engine 14 and the generator 16 are connected through a power transfer unit 24, which, in the exemplary embodiment, is a planetary gear set. Other types of power transfer units, including other gear sets and transmissions, may be used to operably connect the engine 14 to the generator 16 in other examples.

In the exemplary embodiment, the power transfer unit 24 includes ring gear 26, a sun gear 28, and a carrier assembly 30. The generator 16 can be driven by the engine 14 through the power transfer unit 24 to convert kinetic energy to electrical energy. The generator 16 can alternatively function as a motor to convert electrical energy into kinetic energy, thereby outputting torque to a shaft 32 connected to the power transfer unit 24. Because the generator 16 is operably connected to the engine 14, the speed of the engine 14 can be controlled by the generator 16.

The ring gear 26 of the power transfer unit 24 can be connected to a shaft 34, which is connected to the vehicle drive wheels 22 through a second power transfer unit 40. The second power transfer unit 40 can include a gear set having a plurality of gears 42. Other power transfer units could instead be used.

In the exemplary embodiment, the gears 42 transfer torque from the engine 14 to a differential 44 to provide traction to the vehicle drive wheels 22. The differential 44 can include a plurality of gears that enable the transfer of torque to the vehicle drive wheels 22. In an exemplary embodiment, the second power transfer unit 40 is mechanically coupled to an axle 46 through the differential 44 to distribute torque to the vehicle drive wheels 22. In a particular embodiment, the power transfer units 24 and 40 are part of a transaxle of the electrified vehicle 12.

The motor 18 can also be employed to drive the vehicle drive wheels 22 by outputting torque to a shaft 48 that is also connected to the second power transfer unit 40. In an embodiment, the motor 18 is part of a regenerative braking system. For example, the motor 18 can output electrical power to the battery pack 20.

The battery pack 20 is an exemplary electrified vehicle battery. The battery pack 20 can be a high-voltage traction battery pack that includes a plurality of battery arrays 50 (i.e., battery modules or groupings of battery cells) capable of outputting electrical power to operate the motor 18, the generator 16, and/or other electrical loads of the electrified vehicle 12. Other types of energy storage devices and/or output devices can also be used to electrically power the electrified vehicle 12.

The electrified vehicle 12 additionally includes a low-voltage battery 52, which can be referred to as an auxiliary battery. The low-voltage battery 52 can be provided for powering various low-voltage loads 54 of the electrified vehicle 12. Non-limiting examples of low-voltage loads include infotainment systems, lighting systems, power windows, power seats, cooling fans, AC compressors, instrument clusters, control modules, etc.

In some examples, the electrified vehicle 12 can provide a user with a substantially mobile office. In such examples, other low-voltage loads may include personal computers, televisions, coffee makers, etc.

A power converter 56 is included within the electrified vehicle to convert a high-voltage DC output from the battery pack 20 to a low-voltage DC supply that is compatible with the low-voltage battery 52. The power converter 56 is, in the exemplary embodiment, a DC/DC step-down converter.

Another power converter 58 can be positioned between the low-voltage battery 52 and the low-voltage loads 54. As required, the power converter 58 can convert the 12 Volt DC output from the low-voltage battery 52 to a supply compatible for use by the low-voltage loads 54. The power converter 60 is a DC/AC inverter.

The example electrified vehicle 12 can further includes another power converter 60 having the form of a DC/AC inverter. The power converter 60 can convert the DC output from the battery pack 20 to an AC supply suitable for use by the low-voltage loads 54 without passing the DC output through the low voltage battery 52.

The low-voltage battery 52 is a 12 Volt battery in the exemplary embodiment. However, the term "low-voltage battery," could include any battery less than, for example, 60 Volts. The low-voltage battery 52 and the low-voltage loads 54 are generally part of a low-voltage system of the electrified vehicle 12 whereas the high-voltage battery pack 20 is generally part of a relatively high-voltage system of the electrified vehicle 12. The high-voltage battery pack 20 is used to power propulsion of the electrified vehicle 12 whereas, generally, the low-voltage battery 52 does not power propulsion of the electrified vehicle 12.

The electrified vehicle 12 is equipped with a charging system 62 for charging the energy storage devices (e.g., battery cells) of the battery pack 20 and the low-voltage battery 52. The charging system 62 can be connected to an external power source 64 (e.g., utility/grid power from an electrical grid) for receiving and distributing power throughout the electrified vehicle 12.

The exemplary embodiment of the charging system 62 includes a charge port assembly. In this example, the charge port assembly includes, among other things, a charge port 66 and a charge port housing 68. Electric vehicle supply equipment (EVSE) 70, such as a charge cord of a charging station, can be operably connected between the charge port 66 and the external power source 64. The charge port 66 can include one or more ports adapted to receive a respective coupler of the EVSE 70. A port of the charge port 66 could be configured to receive DC power, for example, and another port could be configured to receive AC power, for example. The charging system 62 can be equipped to accommodate one or more conventional voltage sources from the external power source 64 (e.g., 110 Volts, 220 Volts, etc.).

The electrified vehicle 12 can include a power converter 72 utilized to, for example, convert AC power received from the external power source 64 to DC power for charging the battery arrays 50 of the battery pack 20. The example power converter 72 is an AC/DC inverter.

Generally, for purposes of this disclosure, a power converter is an assembly of the electrified vehicle 12 that converts electric energy from one form to another, such as by converting between AC and DC by changing the voltage or frequency or by some combination of these.

Power converters generate thermal energy during power conversion. The exemplary disclosure utilizes this thermal energy as will be explained.

The powertrain 10 of FIG. 1 is shown in a highly schematic form and is not intended to limit this disclosure. Various additional components could alternatively or additionally be employed by the powertrain within the scope of this disclosure. In addition, the teachings of this disclosure could be applied to any electrified vehicle having power converters and a charge port.

Figure 2:
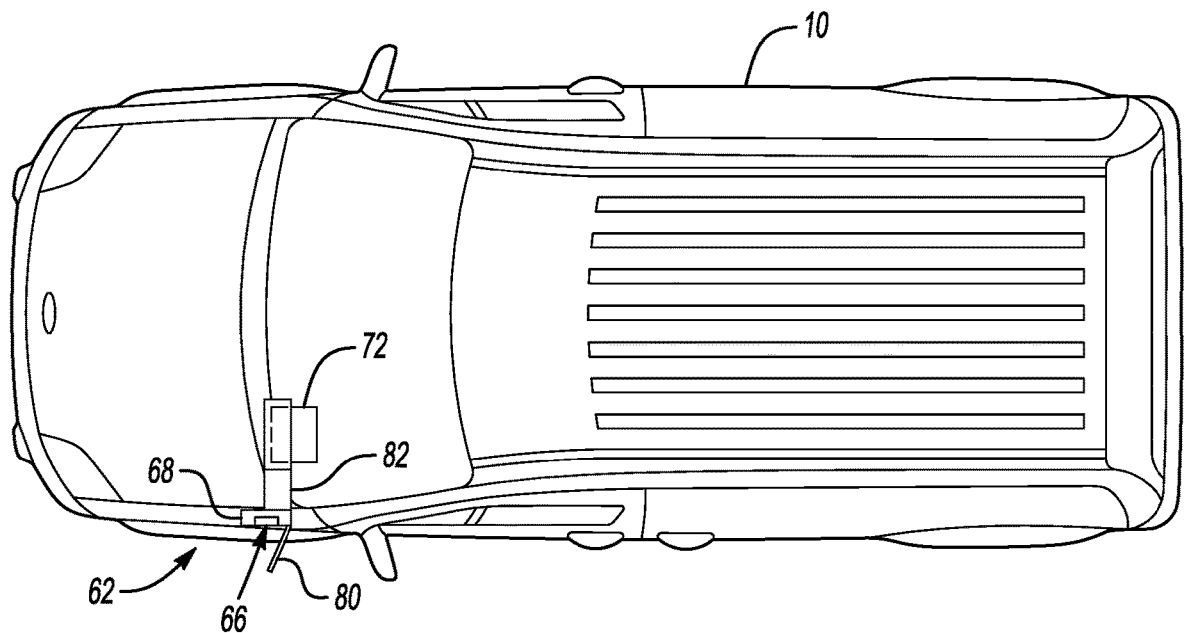
FIG. 2 illustrates a top view of the electrified vehicle of FIG. 1 with selected portions schematically shown.
Figure 3:
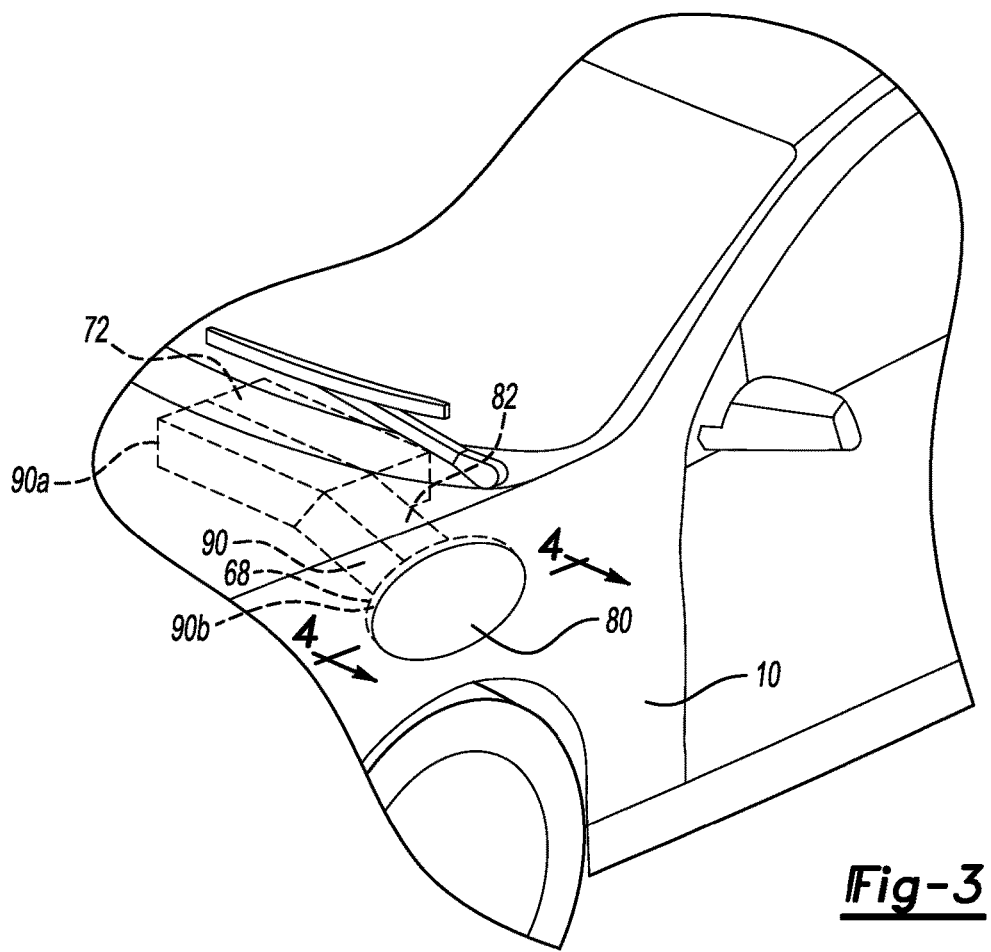
FIG. 3 illustrates a perspective view of selected portions of the electrified vehicle of FIG. 2.
Figure 4:
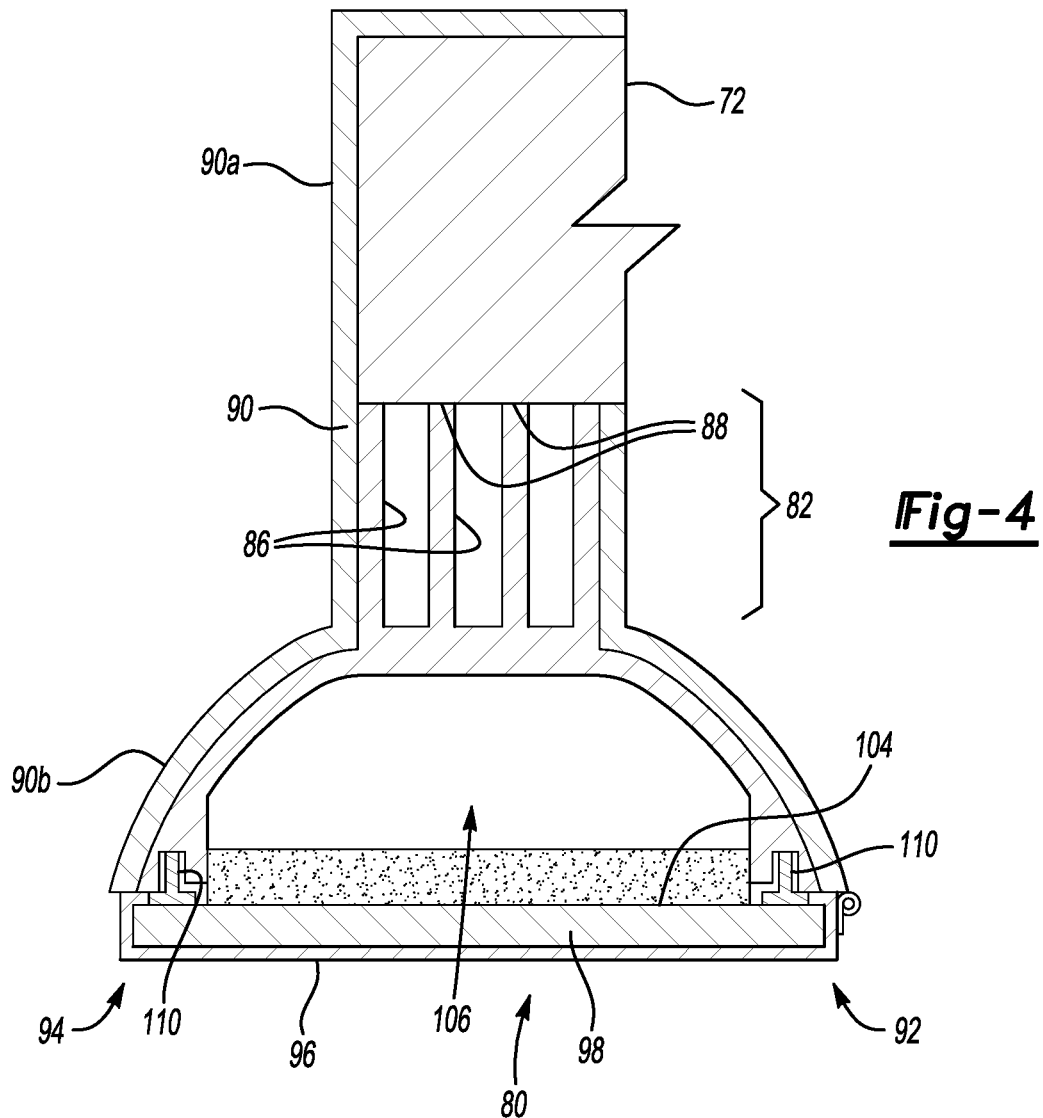
FIG. 4 illustrates a section taken at line 4-4 in FIG. 3.
Figure 5:
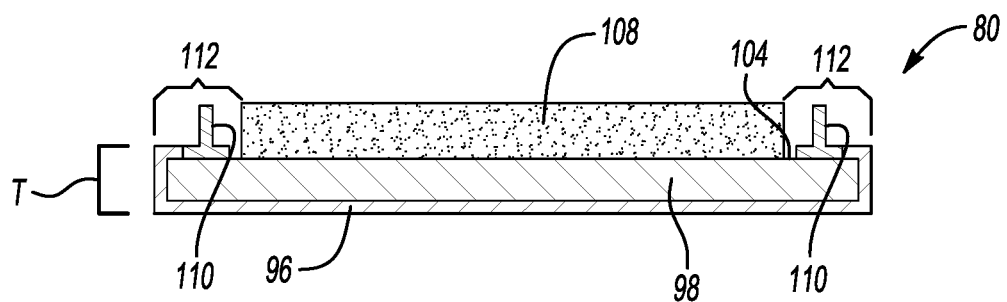
FIG. 5 illustrates a close-up view of a charge port door from the section of FIG. 4.

Referring now to FIGS. 2-5, the electrified vehicle 12 includes a charge port door 80 that, when closed, covers the charge port 66 of the charging system 62. The charge port door 80 in FIG. 2 is shown in an open position. In FIGS. 3-4, the charge port door 80 is in a closed position.

From time to time, the electrified vehicle 12 may be positioned in an area experiencing inclement weather and low temperatures. If, for example, ice and/or snow buildup near the charging system 62, a user may be prevented from moving the charge port door 80 between the open and closed positions. The buildup of ice and/or snow could further block, or otherwise interfere with, coupling the EVSE 70 to the charge port 66, or decoupling the EVSE 70 from the charge port 66.

In some examples, such as when the user is utilizing the electrified vehicle 12 as a mobile office, the user may wish to remain within the electrified vehicle 12 and operate devices that rely on the low-voltage loads 54. The user may further wish to continue to charge the battery pack 20 from the external power source 64 while remaining within the electrified vehicle 12. Keeping areas of the charging system 62 free from ice and snow may be particularly useful in such examples.

Generally, keeping areas of the charging system 62 free from ice and snow can facilitate movement of the charge port door 80, as well as facilitate coupling and decoupling the electric vehicle supply equipment 70 from the charge port 66.

To keep the areas of the charging system 62 free from ice and snow, thermal energy is directed from the power converter 72 through a thermal conduit 82 to the charging system 62. The power converter 72, as previously described, can generate thermal energy during operation.

Although the power converter 72 is depicted in FIGS. 2 and 3 as providing thermal energy to the thermal conduit 82, the electrified vehicle 12 could, in other examples, use other power converters to provide thermal energy to the thermal conduit 82. The other power converters could include the DC/DC power converter 56, the DC/AC power converters 58 and 60, or some combination of these.

In the exemplary embodiment, the thermal conduit 82 is formed together with the charge port housing 68 as a single monolithic structure. The thermal conduit 82 and the charge port housing 68 can have, for example, a material composition that is polymer-based. The material composition can include an additive, such as a ceramic or boron nitride additive. The additive can facilitate the communication of thermal energy from the power converter 72 to the charging system 62.

In the exemplary embodiment, the thermal conduit 82 comprises a plurality of fins 86. Each of the fins 86 extends from the charge port housing 68 to the power converter 72 such that the fins 86 each directly contact a surface of the power converter 72 at, for example, areas 88. Thermal energy moves from the power converter 72 through the fins 86 to areas near the charge port housing 68 and the charge port 66.

In another example, the thermal conduit 82 could include a substantially solid piece of conduit material in place of the fins 86. In such an example, the gaps between the fins 86 would be omitted. The fins 86, however, may be desirable, for example, for manufacturing reasons.

The thermal conduit 82 includes an outer insulative layer 90 disposed about the fins 86. In the exemplary embodiment, the outer insulative layer 90 further extends about a portion of the power converter 72 in area 90a, and about a portion of the charge port housing 68 in at least area 90b. The outer insulative layer 90 is an outer layer relative to the fins 86, which provide an inner thermally conductive layer.

In the exemplary embodiment, the outer insulative layer 90 is overmolded about the fins 86. In an example, the charge port housing 68 could be first molded together with the fins 86. The charge port housing 68 can then be positioned in a mold and the material of the outer insulative layer 90 molded about the desired portions of the charge port housing 68.

The outer insulative layer 90 can by polymer-based. In an exemplary embodiment, the outer insulative layer 90 is a rubber or another type of insulative plastic.

As the power converter 72 generates thermal energy, the thermal energy can move through the areas 88, and then through the fins 86 to the areas near the charge port housing 68 and the charge port 66. The thermal energy warms these areas. The outer insulative layer 90 helps to contain the thermal energy within the thermal conduit 82 and to direct the thermal energy to desired areas.

In some examples, the thermal conduit 82 can be designed to additionally direct thermal energy to leaf screen area and wiper area shown in FIG. 3. Directing thermal energy to these areas can facilitate keeping the wiper free from restrictions due to ice and snow, as well as help to keep the air intake through the leaf screen free from ice and snow.

The charge port door 80 can include features to help direct thermal energy into desired areas, such as area 92 where the charge port door 80 is pivotably connected to the charge port housing 68, and area 94 where the charge port door 80 latches to the charge port housing 68 when in the closed position.

The charge port door 80 can include, for example, a polymer-based skin 96 wrapped at least partially about a foam core 98. An overall thickness T of the skin 96 wrapped around the foam core 98 can be about 4.0 millimeters in some examples.

The skin 96 could be Acrylonitrile Butadiene Styrene (ABS). ABS is relatively easy to paint and can have a low thermal conductivity when compared to other polymer-based materials. ABS, however, can have a thermal conductivity of about 0.18 Watt per Meter per Kelvin (W/m-K).

The foam core 98 can be used to further reduce the thermal conductivity of the charge port door 80 and thereby retain more thermal energy within an open area 100 of the charge port assembly when the charge port door 80 is in the closed position. In some examples, the charge port door 80 is from about 10 to 12% foam. Incorporating the foam has been found to reduce a thermal conductivity of the door from 0.18 W/m-K to about 0.06 W/m-K (i.e., about a factor of 3).

In an example, the foam 98 can be a microcellular foam provided by an endothermic chemical foaming agent that is added to a resin mix prior to molding, or by a microcellular foam injection molding process.

The charge port door 80 can be molded via a process that keeps the cavity tool substantially hot. It has been found that heating the tool utilized to mold the charge port door 80 to roughly +/−10° C. cooler than the melting point of the material to be molded can eliminate surface defects, such as those defects resembling splay.

Commercially available induction systems can be utilized to heat the tool prior to molding the charge port door 80. Other methods of heating the tool like hot oil heaters or preheating the tool prior to molding the charge port door 80 could be utilized in other examples.

A backside 104 of the charge port door 80 is an area of the charge port door 80 that faces inwardly toward the charge port 66 when the charge port door 80 is in the closed position. To further insulate the charge port door 80, a piece of foam 108 is bonded to the backside 104 of the charge port door 80. The foam 108 is adhesively bonded to the backside 104 in some examples. The foam 108 is separate from the foam 98. The foam 108 is an insulative layer added to the backside 104 of the charge port door 80.

Door seals 110 are positioned at the lateral periphery of the piece of foam 108. The door seals 110 can touch against the charge port housing 68 when the charge port door 80 is in the closed position as shown in FIG. 4 to protect against contaminants, such as dust and dirt from entering the open area 100. The door seals 110 can be molded along the backside 104 of the charge port door 80 utilizing a conventional two-shot molding technology in some examples.

The foam 108 can be, for example, a polyethylene foam having a thermal conductivity of about 0.02 to 0.04 W/m-K. Other types of foams could be used in other examples.

Adding, for example, the foam 108, which in this example is 4.0 millimeters thick, has been found to substantially triple a thermal resistivity of the charge port door 80. Notably, the foam 108 is undersized relative to the backside 104, which leaves peripheral portions 112 of the backside uncovered by the foam 108. Leaving the peripheral portions 112 uncovered can facilitate thermal energy movement into the areas 92 and 94, which are near the hinge and the latch. The thermal energy in these areas can desirably help to inhibit the buildup of ice and snow from the hinge and the latch, and the surrounding areas. Inhibiting buildup in these areas is particularly important as these areas of the charge port door 80 need to move substantially freely relative to the charge port housing 68 in order for the charge port door 80 to move between open and closed positions.

Referring again to the two-shot molding process utilized to form the thermal conduit 82 with the outer insulative layer 90, the thermal conduit 82 and the charge port housing 68 can be modified to be thermally conductive by adding a graphite and/or carbon black additive.

The charge port housing 68 and the thermal conduit 82 can be formed from a base material that is primarily nylon such as an E369 grade PA6 nylon which has a thermal conductivity of about 31 W/m-K. This type of nylon, in some examples, is over 100 times more thermally conductive than more conventional plastic materials. This type of nylon also has an electrical resistivity of 0.02 ohm-meters, which is significantly more conductive than normal PA6 nylon. Normal PA6 nylon, for example, typically has an electrical resistivity of $10^{15}$ ohm-meters. Due to, among other things, the electrical resistivity of such nylon, the material of the charge port housing 68 can be grounded and provide electromagnetic interference shielding for the charging system 62.

As to the outer insulative layer 90, in some examples, it can be desirable to have the outer insulative layer 90 structurally foamed to increase its thermally insulative properties. Foaming agents are can be directly injected to the outer insulative layer 90 using microcellular foam injection molding processes. Unlike the charge port door 80, appearance issues associated with the charge port housing 68 are not as noticeable as the charge port housing 68 is less visible. Accordingly, heating a mold used to mold the charge port housing 68 may not be required.

Features of the disclosed examples include utilizing thermal energy from a power converter to heat a charge port area of an electrified vehicle. No additional electrical load is required to power the heating. Instead, the thermal energy is provided by already operating areas of the electrified vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a power converter;
   a charge port assembly; and
   a thermal conduit that conveys thermal energy from the power converter to the charge port assembly.

2. The vehicle assembly of claim 1, wherein the charge port assembly includes a charge port housing, the charge port housing and the thermal conduit formed together as a single monolithic structure.

3. The vehicle assembly of claim 2, further comprising a charge port door pivotably connected to the charge port housing.

4. The vehicle assembly of claim 3, further comprising an insulative layer covering at least a portion of a backside of the charge port door, the backside facing inwardly toward the charge port when the charge port door is in a closed position.

5. The vehicle assembly of claim 4, wherein the insulative layer is undersized relative to the backside such that a peripheral portion of the backside is left uncovered by the insulative layer.

6. The vehicle assembly of claim 1, wherein the thermal conduit includes an outer insulative layer and an inner thermally conductive layer.

7. The vehicle assembly of claim 6, wherein the outer insulative layer and the inner thermally conductive layer are both polymer-based.

8. The vehicle assembly of claim 6, wherein the inner thermally conductive layer comprises a thermally conductive ceramic.

9. The vehicle assembly of claim 6, wherein the outer insulative layer is overmolded about the inner conductive layer.

10. The vehicle assembly of claim 1, wherein the thermal conduit comprises a plurality of fins, each of the fins extends from the charge port housing to directly contact power converter.

11. The vehicle assembly of claim 1, wherein the power converter is a DC/DC step-down converter.

12. A charge port heating method, comprising:
   generating thermal energy with a power converter of a vehicle; and
   directing the thermal energy from the power converter to a charge port assembly using a thermal conduit.

13. The charge port heating method of claim 12, wherein a first end portion of the thermal conduit interfaces directly with the power converter, and an opposite, second end portion of the thermal conduit extends directly from the charge port housing.

14. The charge port heating method of claim 12, wherein the thermal conduit comprises a polymer-based material composition that includes an additive.

15. The charge port heating method of claim 14, wherein the additive is graphite.

16. The charge port heating method of claim 14, further comprising insulating the polymer-based material composition with an outer insulative layer.

17. The charge port heating method of claim 12, further comprising, at the power converter, converting a supply of power from a first voltage to a different, second voltage.

18. The charge port heating method of claim 17, further comprising providing the supply of power from a traction battery of an electrified vehicle.

19. The charge port heating method of claim 12, further comprising directing the thermal energy toward an outer peripheral portion of a charge port door while insulating an inner peripheral portion of the charge port door from the thermal energy.

* * * * *